United States Patent Office 3,709,719
Patented Jan. 9, 1973

3,709,719
PROCESS FOR POLYMERIZING IMPREGNATED MONOMER AND MATERIAL PREPARED THEREBY
Martin A. Welt, Rego Park, N.Y., assignor to Radiation Technology, Inc., Long Island, N.Y.
No Drawing. Filed Aug. 15, 1969, Ser. No. 850,621
Int. Cl. B44d 1/50
U.S. Cl. 117—93.31      4 Claims

ABSTRACT OF THE DISCLOSURE

A process for producing materials having improved mechanical properties and an esthetically appealing appearance includes impregnating a subject masonry material with a radiation polymerizable monomer, and subsequentially polymerizing the monomer by irradiation.

In accordance with one aspect of the invention, the impregnation is effected by drawing the monomer into and about the subject material in a vacuum chamber. The chamber and its contents are then exposed to gamma radiation of controlled dosage such that the monomer impregnated within the masonry material polymerizes, while the monomer bath does not.

DISCLOSURE OF INVENTION

This invention relates to a method for fabricating improved construction, decorative, and other materials by radiation processing, and to the materials produced thereby.

Many construction materials, e.g., masonry products for pipelines or building fabrication, have suitable properties (compressive strength or the like) for many applications, but are unsatisfactory in other respects. For example, concrete and other masonry products have relatively poor tensile strength characteristics, and are porous thus providing unsatisfactory environmental seals to impede water propagation.

Further, masonry compositions are often unsuitable in appearance for use on external or exposed building and room surfaces. Thus, materials such as marble or polished stones are typically employed for glossy, esthetically appealing surface facing materials. Such decorative materials are expensive, and also require careful bonding to a backing material. Moreover, these materials, while appearing smooth, in fact exhibit surface lands and grooves which retain dirt and other waste particles. Accordingly, marble and the like require expensive periodic cleaning, as by sandblasting.

It is thus an object of the present invention to provide a method for fabricating an improved construction material, and to provide the material produced thereby.

More specifically, an object of the present invention is the provision of a process for increasing the compressive and tensile strength of subject materials; increasing the freeze and thaw resistance of the material; and for increasing its corrosion resistance and reducing its porosity.

These and other objects of the present invention are realized in a specific illustrative process wherein a masonry bulk material is inserted in a vacuum chamber into which is inserted, in order, a radiation polymerizable monomer, and an inert gas to induce a slight overpressure in the chamber. The vacuum, and the subsequent overpressure, impregnate the masonry material with the monomer.

The chamber is then exposed to nuclear radiation. The incident energy is absorbed by the contents of the chamber (masonry and monomer) in direct relationship to the density of these materials. Accordingly, the energy transfer is such that the monomer impregnated within the masonry (or other subject) block absorbs a good deal more of the incident energy than the external monomer bath.

The process is terminated when the monomer impregnated within the subject material has irreversibly polymerized, while the bath has not received a sufficient energy transfer for this effect to obtain.

The material is then extracted from the bath and chamber. The finished material, with its polymerized impregnated plastic, has greatly improved strength and environmental resistance properties vis-a-vis the original material. Also, the surface of the material is smooth and glossy, and comprises an extremely attractive surfacing material which also has improved wear and other physical characteristics.

The above and other objects, features and advantages of the present invention are realized in an illustrative method for producing an improved composition, which is described herein by way of illustration and not limitation as a masonry material (building block, concrete, brick, stone, cement, ceramic or the like).

In the practice of my process, a monomer which will polymerize upon exposure to incident nuclear radiation is employed. Such monomers are well known and include for example, methyl methacrylate, styrene, acrylonitrile, styrene-1% divinylbenzene, vinyl acetate, vinyl maleate, acrylic acid, butyl acrylate, butyl methacrylate, methacrylic acid, ethylene gas dissolved in sulphur dioxide, or a mixture of 60% styrene and 40% acrylonitrile. Other suitable monomers are well known to those skilled in the art.

In the practice of my invention, the subject host material is first impregnated with the radiation polymerizable monomer, and the monomer is subsequently irreversibly polymerized by exposure to suitable radiation, typically gamma or electron radiation.

The monomer may be impregnated into the subject masonry or other material in any well known manner, as by painting, spraying, dipping, or mixture with the masonry constituents before the host material is set. The impregnated material is then polymerized by exposure to a radiation energy source, e.g. Cobalt 60, until the required radiation energy is transferred (e.g. 8–40 megarads depending upon the monomer employed).

To aid in the process, the monomer may be partially cured to a heavy, low viscosity fluid state before impregnation to reduce the energy absorption required for the primary radiation polymerizing operation.

In accordance with one aspect of the present invention, I insert the subject masonry block or other subject material in a vacuum chamber, and after the interstices of the operand material are purged, open a valve to draw monomer material from a connected chamber into the vacuum chamber to create a monomer bath about the block. An inert gas, e.g., nitrogen, is then inserted into the chamber such that the chamber is under a slight overpressure with respect to the interstices of the operand block. Accordingly, a portion of the monomer material is forced into, and impregnates the masonry block.

The chamber and, more importantly, its contents, are exposed to Cobalt 60 radiation. The building block material, being much more dense than the monomer, absorbs proportionally more incident energy than the monomer bath. Accordingly, the monomer impregnated within the subject material is supplied with a greater amount of energy during the energy transfer process than does the surrounding monomer bath. Accordingly, the process is conducted, i.e., the exposure to radiation continues, until the impregnated monomer is polymerized, but the bath is not. Overexposure, i.e., polymerization of the monomer bath, will result in the desired block material being trapped within an outer plastic material which, in turn, is secured within the original vacuum chamber.

After the process is properly terminated, the block is removed from the still viscous bath. It may then be exposed to further radiation to polymerize any remaining monomer.

The final product prepared as above comprises the original masonry material having the polymerized plastic mechanically secured within its interstices and disposed about the outer surface thereof. For decorative purposes, the monomer (and thereby also, the resulting plastic) may be dyed any color, and/or mixed with small stone or other additive particles to produce a terrazzo effect.

The final product, in addition to its decorative appearance, has improved mechanical properties. For example, cement blocks having a polymerized methyl methacrylate monomer prepared by the above vacuum impregnation and irradiation process exhibits the following properties compared with the original cement material:

(1) Compressive strength increased by up to four times,
(2) Tensile strength increased up to four times,
(3) Elastic modules increased up to two times,
(4) Absorption reduced by 95%,
(5) Abrasion resistance increased two to five times,
(6) Cavitation resistance increased up to sixteen times,
(7) Hardness increased 140 to 190%,
(8) Freezing and thraw durability tests—the cement control failed at 550 cycles while the concrete polymer showed no weight loss after 790 cycles.

It is to be understood that the above-described method and product are only descriptive of the principles of the present invention. Numerous adaptations thereof will be readily apparent to those skilled in the art without departing from the spirit and scope of the present invention. For example, when a glazed surface is not required as for a strong basic construction material, monomer impregnated materials may be wrapped, and then exposed to radiation in any convenient manner.

What is claimed is:

1. The process for fabricating a masonry-plastic material having a glossy, smooth surface, improved wear and resistance properties, and a low porosity comprising the steps of impregnating a masonry material with a monomer which polymerizes upon exposure to radiation including the operation of inserting said masonry material in a bath of said monomer, and polymerizing said monomer impregnated in said masonry material while said material resides in said monomer bath by exposing said material and said bath to a source of radiation sufficient to polymerize said impregnated monomer, but insufficient to polymerize said bath monomer.

2. A process as in claim 1 wherein said impregnation step comprises inserting said masonry material into a vacuum chamber, and drawing said monomer into said chamber.

3. A process as in claim 2 further comprising the step of introducing an inert gas into said chamber after said monomer has been drawn into said chamber to facilitate impregnation of said monomer into said masonry material.

4. The process for fabricating a composition formed of a subject material having a plasticized polymer therein to decrease the porosity, corrosive, and weather susceptibility of said subject material while increasing its mechanical strength properties comprising the steps of impregnating said material with a monomer which polymerizes upon exposure to nuclear radiation, said impregnating step including the immersion of said subject material into a bath of said monomer, and polymerizing said monomer impregnated within said subject material and not polymerizing said monomer bath by directing a controlled dosage of radiation energy at said impregnated subject material while in said bath.

References Cited

UNITED STATES PATENTS 3,471,386  10/1969  D'Alelio _____ 110—161 K

ALFRED L. LEAVITT, Primary Examiner

J. H. NEWSOME, Assistant Examiner

U.S. Cl. X.R.

117—123 D, 161 UZ